United States Patent
Yoshimi

(10) Patent No.: US 9,033,017 B2
(45) Date of Patent: May 19, 2015

(54) PNEUMATIC TIRE

(75) Inventor: Takuya Yoshimi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 351 days.

(21) Appl. No.: 13/516,328

(22) PCT Filed: Dec. 17, 2010

(86) PCT No.: PCT/JP2010/072793
§ 371 (c)(1),
(2), (4) Date: Jun. 15, 2012

(87) PCT Pub. No.: WO2011/074676
PCT Pub. Date: Jun. 23, 2011

(65) Prior Publication Data
US 2012/0247639 A1    Oct. 4, 2012

(30) Foreign Application Priority Data

Dec. 18, 2009  (JP) .................. 2009-287637

(51) Int. Cl.
*B60C 9/04*    (2006.01)
*B60C 9/02*    (2006.01)
(Continued)

(52) U.S. Cl.
CPC ....... *B60C 9/0042* (2013.04); *B60C 2009/0458* (2013.04); *B60C 2009/0416* (2013.04); *B60C 2009/045* (2013.04); *B29D 30/38* (2013.01); *B29D 2030/383* (2013.01); *B60C 9/04* (2013.01);
(Continued)

(58) Field of Classification Search
CPC ............ B60C 9/02; B60C 9/004; B60C 9/04; B60C 2009/0416; B60C 2009/0425

USPC ........................................ 152/451, 548, 556
See application file for complete search history.

(56) References Cited

U.S. PATENT DOCUMENTS 3,901,751 A * 8/1975 Wilson ........................ 156/133
4,628,978 A * 12/1986 Imai et al. ................... 152/556
5,891,567 A    4/1999 Kim et al.
(Continued)

FOREIGN PATENT DOCUMENTS

CN    1176670 A    3/1998
CN    101107139 A  1/2008
(Continued)

OTHER PUBLICATIONS

English machine translation of JP2002-002214, no date.*
(Continued)

*Primary Examiner* — Justin Fischer
*Assistant Examiner* — Robert Dye
(74) *Attorney, Agent, or Firm* — Sughrue Mion, PLLC

(57) ABSTRACT

Provided is a pneumatic tire whose safety factor and durability are improved without generating a problem of an increase in the weight of a tire and an increase in the inner surface cord protrusion failure. Provided is a pneumatic tire including one or more carcasses 2 extending toroidally between bead cores 1 embedded in a pair of bead portions 11 respectively. A polyester fiber cord whose total decitex as a twisted cord is 4300 to 5100 dtex, whose cord strength as a dip treated cord is 6.5 to 7.2 cN/dtex and whose cord elongation at a stress loading of 2 cN/dtex is 3.5 to 4.0% is used as a reinforcing cord of the carcass 2, and the tenacity of a treat which is the reinforcing cord covered with rubber per unit width is 2.9 to 3.2 kN/cm.

8 Claims, 1 Drawing Sheet

(51) Int. Cl.
 *B60C 9/00* (2006.01)
 *B29D 30/38* (2006.01)

(52) U.S. Cl.
 CPC . *B60C 2009/0466* (2013.04); *B60C 2009/0425* (2013.04); *B60C 2009/0433* (2013.04)

(56) References Cited

U.S. PATENT DOCUMENTS

| | | | |
|---|---|---|---|
| 6,519,925 B2 * | 2/2003 | Kim et al. | 57/237 |
| 2008/0121327 A1 | 5/2008 | Matsumura et al. | |
| 2008/0156409 A1 | 7/2008 | Yokokura et al. | |

FOREIGN PATENT DOCUMENTS

| | | | |
|---|---|---|---|
| CN | 101107395 A | | 1/2008 |
| EP | 1925467 | * | 5/2008 |
| JP | 06-024206 A | | 2/1994 |
| JP | 06-041655 B | * | 6/1994 |
| JP | 2000-301910 A | | 10/2000 |
| JP | 2002-002214 A | | 1/2002 |
| JP | 2002-127712 A | | 5/2002 |
| JP | 2003-213539 A | | 7/2003 |
| JP | 2007-331619 A | | 12/2007 |
| JP | 2008-001163 A | | 1/2008 |
| JP | 2008-001164 A | | 1/2008 |
| JP | 2009-46783 A | | 3/2009 |

OTHER PUBLICATIONS

English machine translation of JP06-041655B, no date.*
International Search Report of PCT/JP2010/072793 dated Jan. 18, 2011.
Chinese Office Action, dated Jul. 18, 2014, issued in corresponding Chinese Patent Application No. 201080057802.6.

* cited by examiner

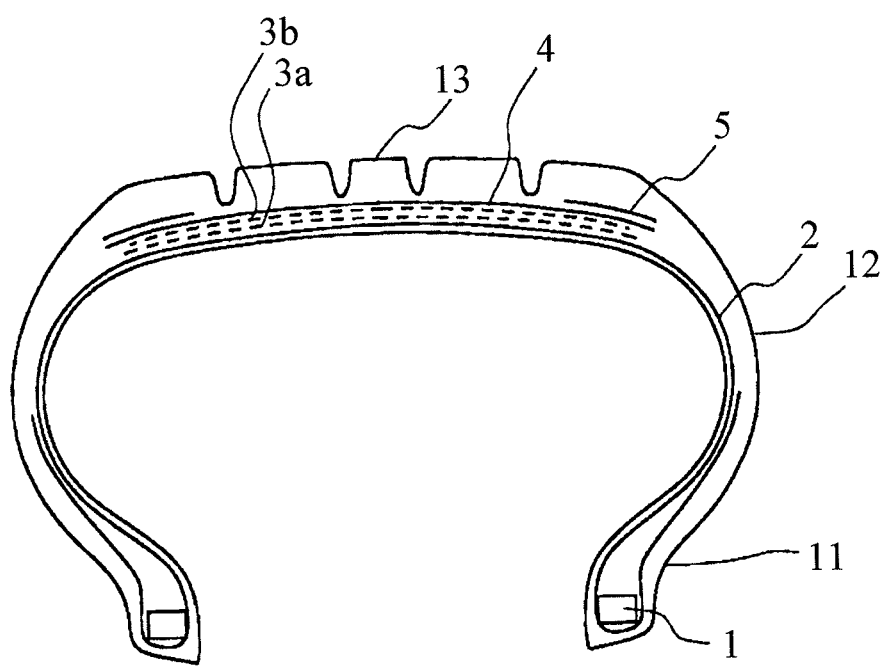

PNEUMATIC TIRE

TECHNICAL FIELD

The present invention relates to a pneumatic tire (hereinafter, also simply referred to as "tire"), more specifically, a pneumatic tire whose carcass ply is improved and in particular to a pneumatic radial tire which is preferable for passenger cars.

BACKGROUND ART

Conventionally, a polyester cord made of polyethylene terephthalate (PET) or the like is used for a carcass cord, a twisted cord of fine yarn having a small total decitex at a high end count, or a twisted cord of thick yarn having a large total decitex at a low end count is individually used. Further, when a high treat tenacity is required, a plurality of the treats are used.

On the other hand, in recent years, because, in place of a tire for lightweight trucks, a tire for passenger cars comes to be used as a tire for SUVs, and because standardization of extra-load (XL) of a tire is being established accompanied with increase in the weight of a car, which is a trend of passenger cars and with increase in demand for the usage thereof at high speed traveling, there are some cases where the durability of the tire considerably deteriorates even when a two-carcass configuration employing a treat which has been used with no trouble is applied. On the other hand, however, when a configuration in which three or more treats are used is applied, a considerable increase in weight is accompanied with deterioration of rolling resistance.

As an improvement technique for a pneumatic radial tire employing a polyester cord as a carcass ply, for example, in Patent Documents 1 and 2, disclosed are techniques, in order to provide a pneumatic radial tire which has an excellent drivability, riding comfort and abrasion resistance, as well as an improved durability performance, a specific steel cord is used as a belt cord, and at the same time, a cord whose cord strength after adhesive treatment is 4.5 cN/dtex or higher, and whose bending rigidity per one cord is 15 to 50 cN is used as a polyester cord used for a carcass ply.

RELATED ART DOCUMENTS

Patent Documents
Patent Document 1: Japanese Unexamined Patent Application Publication No. 2008-001163 (the claims and the like)
Patent Document 2: Japanese Unexamined Patent Application Publication No. 2008-001164 (the claims and the like)

SUMMARY OF THE INVENTION

Problems to be Solved by the Invention

It is generally known that, by adjusting the tenacity and the number of a treat used for a carcass, the safety factor (pressure break resistance) or cutting resistance when inflated to an inner pressure can be controlled, and that increasing of the number of treats, thickening of a cord, increasing of the end count, increasing of the strength of a dipped cord or the like leads to the improvement of the safety factor or cutting resistance.

As mentioned above, however, in order to decrease the weight of a tire, that is, to decrease the rolling resistance, it is not preferred to increase the number of treats. When a cord is made into a thick yarn, or tension during an adhesive treatment (dip treatment) is increased in order to increase the cord strength, the heat shrinkage stress of the cord increases, which leads to a problem of frequent protrusion of cord on the inner surface of a tire. Further, in this case, there is also a problem of deterioration of uniformity due to stress concentration at the joint portion of a carcass. The above-mentioned protrusion of cord on the inner surface of a tire can be suppressed by arranging a squeegee rubber between a carcass treat and an inner liner, which is also not preferred because the arrangement of the squeegee rubber is a cause of an increase in weight of a tire (that is, deterioration of the rolling resistance).

In cases where the end count is increased or in cases where the end count is not changed and the cord is made thick, although the treat tenacity becomes high, since the cord occupancy rate is increased, that is, the percentage of void becomes small and the distance between cord-cord becomes small, separation due to deformation during traveling tends to occur, resulting in deterioration of the durability. Also, the treat gauge becomes thick, which may lead to an increase in the weight of the whole tire.

As described above, although a wide variety of techniques for improving the safety factor and the durability of a tire without compromising other performances have been conventionally studied, such techniques are not satisfactory, and improvement techniques have been further desired to be attained. Accordingly, an object of the present invention is to overcome the above-mentioned problems, and to provide a pneumatic tire whose safety factor and durability are improved without generating a problem of an increase in the weight of a tire and an increase in the inner surface cord protrusion failure.

Means for Solving the Problems

The present inventor intensively studied to discover that the above-mentioned problems can be overcome by using, as a reinforcing cord for a carcass ply, a polyester fiber cord which has a predetermined cord strength and elongation corresponding to a desired treat tenacity by allowing a twisted cord having a large diameter to be subjected to an appropriate dip treatment, thereby completing the present invention.

That is, the pneumatic tire of the present invention is a pneumatic tire comprising one or more carcasses extending toroidally between bead cores embedded in a pair of bead portions respectively, wherein
a polyester fiber cord whose total decitex as a twisted cord is 4300 to 5100 dtex, whose cord strength as a dip treated cord is 6.5 to 7.2 cN/dtex and whose cord elongation at a stress loading of 2 cN/dtex is 3.5 to 4.0% is used as a reinforcing cord of the carcass, and the tenacity of a treat which is the reinforcing cord covered with rubber per unit width is 2.9 to 3.2 kN/cm.

In the present invention, the occupancy rate of the reinforcing cord in the treat is preferably 70 to 80%, and also, the twist coefficient α of the reinforcing cord defined by the following formula:

$$\alpha = \tan\theta = 0.001 \times N \times \sqrt{(0.125 \times D/\rho)}$$

(in the formula, N represents the number of twist (cycle/10 cm), D represents a value which is half of the total decitex of the cord and ρ represents a specific gravity of the cord) is preferably 0.42 to 0.55.

In the present invention, the heat shrinkage stress of the reinforcing cord per one cord as a dip treated cord at a temperature of 177° C. is preferably 6 to 12 N. Further, as the polyester fiber, polyethylene terephthalate (PET) fiber can be preferable used. Still further, in the present invention, one side of the treat is preferably subjected to an electron beam irradiation treatment as a pre-vulcanization, under an accelerating voltage of not lower than 200 kV and lower than 600 kV, an irradiation dose of 10 to 100 kGy, and the irradiated area is preferably positioned inside the tire.

Effects of the Invention

In the present invention, by employing the above-mentioned constitution, a pneumatic tire whose safety factor and durability are improved without generating a problem of an increase in the weight of a tire and an increase in the inner surface cord protrusion failure can be attained.

BRIEF DESCRIPTION OF DRAWINGS

FIG. 1 is a half sectional view illustrating a pneumatic tire of one embodiment of the present invention.

MODES FOR CARRYING OUT THE INVENTION

Preferred embodiments of the present invention will now be described in detail with reference to the drawings.

FIG. 1 is a cross-sectional view in the width direction of one example of a pneumatic tire of the present invention. As illustrated, the pneumatic tire of the present invention is composed of a pair of bead portions 11, a pair of side wall portions 12 extending therefrom, a tread portion 13 extending between both sides of the side wall portions 12, and provided with one or more carcasses 2 reinforcing all of the portions between a pair of bead cores 1 embedded in the bead portions 11 respectively.

In the present invention, a polyester fiber cord whose total decitex as a twisted cord is 4300 to 5100 dtex, whose cord strength as a dip treated cord is 6.5 to 7.2 cN/dtex and whose cord elongation at a stress loading of 2 cN/dtex is 3.5 to 4.0% is required to be used as a reinforcing cord of a carcass 2. By using a polyester fiber cord satisfying such conditions as a reinforcing cord of the carcass 2, the tenacity of a treat which is the reinforcing cord covered with rubber per unit width can be 2.9 to 3.2 kN/cm, and a pneumatic tire whose safety factor and durability are improved without generating a problem of an increase in the weight of a tire and an increase in the inner surface cord protrusion failure as in the conventional method can be attained. In particular, in the present invention, when two or more carcasses 2 are used, a polyester fiber cord which satisfies the above-mentioned conditions for all of the carcasses is required to be used.

In the present invention, by using a polyester fiber cord having a cord strength and a cord elongation at a stress loading of 2 cN/dtex in the above-mentioned range, a treat tenacity in the above-mentioned range can be obtained. Examples of the method of obtaining a polyester fiber cord having a cord strength and a cord elongation at a stress loading of 2 cN/dtex in the above-mentioned range include a method in which dipping conditions such as temperature, tension and exposure time are adjusted. Concretely, for example, in a dipping process of a polyester fiber cord, when the tension is increased, the cord strength tends to be large, and the cord elongation at a stress loading of 2 cN/dtex tends to be small. Further, when the temperature or the exposure time is increased, the cord strength tends to be small, and the cord elongation at a stress loading of 2 cN/dtex tends to be small. Accordingly, by appropriately combining and adjusting such dipping conditions, physical properties of the cord can be controlled as desired.

In the present invention, the heat shrinkage stress of the reinforcing cord per one cord as a dip treated cord at a temperature of 177° C. is preferably 6 to 12 N. When the heat shrinkage stress of the reinforcing cord is smaller than 6N, the effect of suppressing the diameter growth by traveling during high speed traveling (during generation of heat) is small, and the effect of improving the durability may not be sufficiently obtained. On the other hand, when the heat shrinkage stress of the reinforcing cord is larger than 12 N, the contraction force of the cord during vulcanization is too large, and the rate of inner surface cord protrusion failure may become high.

Further, in the present invention, the occupancy rate (percentage of void) of the reinforcing cord in the above-mentioned treat is preferably 70 to 80%. Here, the occupancy rate of the reinforcing cord in the treat is defined by the following formula:

occupancy rate (%)=cord gauge (mm)×end count (cords/cm)/10×100, and means the occupancy rate of the cord in the array direction of the cord. Although there are no problems even when the cord occupancy rate is lower than 70%, a necessary treat tenacity may not be obtained. On the other hand, when the cord occupancy rate is higher than 80%, because the distance between cord-cord is too small, the effect of suppressing the separation is not sufficient even when the deformation during traveling is suppressed, and the effect of improving durability may not be obtained sufficiently.

As mentioned above, even when the cord occupancy rate is high, that is, even when the end count is large, the occurrence of separation is suppressed and the deterioration of durability can be suppressed, which is an advantage of the present invention. Conventionally, since the durability may deteriorate when the cord occupancy rate is too high, a high cord occupancy rate has not been applied. In the present invention, it is discovered that, by combining a high cord occupancy rate and a heat shrinkage stress in the above-mentioned range, the temperature of a tire during high speed traveling is increased to generate heat shrinkage stress of the cord, which can suppress the diameter growth due to traveling. By this, a shear deformation generated around the carcass treat is suppressed and the occurrence of separation is suppressed to secure a sufficient durability.

In the present invention, the twist coefficient α of the reinforcing cord defined by the following formula:

α=tan θ=0.001×N×√(0.125×D/ρ)

(in the formula, N represents the number of twist (cycle/10 cm), D represents a value which is half of the total decitex of the cord and ρ represents a specific gravity of the cord) is preferably 0.42 to 0.55. When the twist coefficient is smaller than 0.42, it may be difficult to secure durability in market due to deterioration of fatigability. On the other hand, when the twist coefficient is larger than 0.55, the heat shrinkage stress of the cord becomes large and the rate of failure is increased and the gauge of the cord is increased, leading to an increase in the weight.

The carcass 2 of the tire in the FIGURE is composed of one carcass ply, and in the present invention, the number of carcass plies which constitute the carcass 2 is not limited thereto and two or more carcass plies may be used. The structure thereof is also not particularly limited thereto. The engaging structure of the radial carcass 2 in the bead portion is also not limited to a structure which is rolled up around the bead core to be engaged as shown in the FIGURE, and may be a structure in which the end of the radial carcass is sandwiched by two layers of bead cores (not shown in the FIGURE). In the present invention, examples of the polyester fiber used for the reinforcing cord of the carcass include polyethylene terephthalate (PET) fiber, polyethylene naphthalate (PEN) fiber and polybutylene terephthalate (PBT) fiber. Among those, PET fiber is preferably used.

Further, in the present invention, when a carcass treat composed of the above-mentioned polyester fiber cord is applied to a tire, it is preferred that one side of the treat is preferably subjected to an electron beam irradiation treatment as a pre-vulcanization, under an accelerating voltage of not lower than 200 kV and lower than 600 kV, an irradiation dose of 10 to 100 kGy, and the irradiated area is preferably positioned inside the tire that is on the side of inner liner to mold the tire. By this, the effect of suppressing the generation of tire inner surface cord protrusion can be obtained, which also leads to a reduction in weight of the tire. Here, when the accelerating voltage at the time of irradiating an electron beam is lower than 200 kV, the penetration of the electron beam becomes insufficient, and the pre-vulcanization is only performed on the surface of the carcass treat, and therefore, the effect of suppressing the generation of tire inner surface cord protrusion may not be sufficiently obtained. On the other hand, when the accelerating voltage is 600 kV or higher, the pre-vulcanization on the surface of the carcass treat excessively proceeds, which may negatively affect the formability or durability of the tire. When the irradiation dose of the electron beam is less than 10 kGy, the penetration of the electron beam becomes insufficient, and the pre-vulcanization is performed only on the surface of the carcass treat, and therefore, the effect of suppressing the generation of tire inner surface cord protrusion may not be sufficiently obtained. On the other hand, when the irradiation dose of the electron beam is 100 kGy or higher, the pre-vulcanization on the surface of the carcass treat excessively proceeds, which may negatively affect the formability or durability of the tire.

In the pneumatic tire of the present invention, only satisfying the condition of the reinforcing cord of the above-mentioned carcass is important. Other conditions such as the tire structure in detail and the material of each of the members are not particularly limited. The tire can be constituted by appropriately selecting the conventionally known conditions.

For example, in the illustrated tire, outside the crown portion of the carcass 2 in the tire radius direction, two belt layers 3a, 3b and belt reinforcing layers 4, 5 are positioned in the mentioned order from inside layer. Among these, belt layers 3a, 3b are composed of a rubberized layer in which cords are arrayed in parallel having a predetermined angle with respect to the tire circumferential direction, preferably a rubberized steel cord layer. The belt layers are provided with at least one layer, and are usually provided with two layers positioned crossed with each other as illustrated. The belt reinforcing layer is composed of a rubberized layer in which organic fiber cords are arrayed substantially in parallel with respect to the tire circumferential direction. In the illustrated example, the belt reinforcing layer is composed of one cap layer 4 arranged over the overall width of the belt layers 3a, 3b and a pair of layered layers 5 arranged on the both ends area of belt layers 2a, 2b. In the present invention, the arrangement of a belt reinforcing layer is not necessary, and a belt reinforcing layer having another structure may be used, and the number of layers is not limited to that of the illustrated example.

Further, on the surface of the tread portion 13, a tread pattern is appropriately formed, and on the innermost layer, an inner liner (not illustrated) is formed. Still further, in the tire of the present invention, as a gas with which the tire to be filled, a normal air or an air whose oxygen partial pressure is changed, or an inert gas such as nitrogen can be used.

EXAMPLES

The present invention will now be described in detail by way of Examples.

A reinforcing cord satisfying the conditions listed on the following Table was applied to a carcass to manufacture a pneumatic tire of size 205/55R16. The belt layer was composed of two rubberized steel cord layers. The two layers were positioned crossed with each other having angles of ±25° with respect to the tire circumferential direction. When a tire was molded, one side of the carcass treat was subjected to an electron beam irradiation treatment. The carcass treat was positioned such that the irradiated area was inside the tire. The results of the evaluations for the obtained test tires were shown in combination in the Table below.

Here, the cord strength and cord elongation of the reinforcing cord in the following Examples and Comparative Examples were controlled by adjusting dipping conditions such as treatment temperature, tension at the treatment and treatment time in a dip treatment process during manufacturing of the cord. In concrete, each reinforcing cord was obtained by changing the conditions in the following range, for a dry zone, a first heat elongation part (heat setting zone) and a second heat elongation part (normalizing zone) in the tension heat treatment process which is performed after giving a cord an RFL (resorcin-formaldehyde) adhesive. In the dry zone, the treatment temperature was set to 160° C., treatment time 60 seconds and the tension in a range of 0.7 to 0.9 g/dtex. The treatment temperature in the heat setting zone and the normalizing zone was set to 240° C. and the treatment time 60 seconds. Further, the tension of the heat setting zone was set in a range of 0.7 to 0.9 g/dtex and the tension of the normalizing zone was set in a range of 0.3 to 0.5 g/dtex.

(1) Durability

Each test tire was set on a drum test machine traveling at 80 km/h while applying a prescribed inner pressure and a prescribed load on the tire to measure the time until a defect occurred. The results were indicated as an index setting the time until the occurrence of a defect of the tire to 100. The larger the index value, the better the durability performance.

(2) Side Cut Performance

Each test tire was mounted to a prescribed rim, and the tire is inflated to a prescribed inner pressure. Thereafter, a convex protrusion, the tip of which had a radius of curvature of R=10 (mm) was pressed on the side portion to measure a work required for the side portion to be cut. The results were indicated as an index setting the work required for side cut of the tire of the Comparative Examples to 100. The larger the value, the better the side cut performance.

(3) Water Pressure (Pressure Resistance)

Each test tire mounted on a rim was filled with water to increase the inner pressure. The pressure at which the tire burst was measured and was indicated as an index setting the burst pressure of the tire of Comparative Example 1 to 100. The larger the index value, the better the pressure resistance performance.

(4) Inner Surface Cord Protrusion Failure Rate

For each test tire, the number of tires which caused an inner surface cord protrusion failure among a prescribed number of manufactured tires was counted. When the number was the same as that of tires which caused a failure in Comparative Example or better (the same number or small number), designated as "◯"; when the number deteriorated (the number was large), designated as "x".

TABLE 1

|  |  | Example 1 | Example 2 | Example 3 | Example 4 | Example 5 | Example 6 |
|---|---|---|---|---|---|---|---|
| reinforcing cord | structure | 1 ply | 1 ply | 1 ply | 1 ply | 1 ply | 1 ply |
|  | material | PET | PET | PET | PET | PET | PEN |
|  | cord size | 2200 dtex/2 | 2200 dtex/2 | 2500 dtex/2 | 2200 dtex/2 | 2500 dtex/2 | 2200 dtex/2 |
|  | twist coefficient | 0.48 | 0.46 | 0.50 | 0.48 | 0.50 | 0.55 |
|  | dip cord strength (cN/dtex) | 6.82 | 6.93 | 6.7 | 6.82 | 6.7 | 6.5 |
|  | 2cN/dtex cord elongation at a stress loading (%) | 4.0 | 3.6 | 3.8 | 4.0 | 3.8 | 3.5 |
|  | heat shrinkage stress of dip cord (N) | 8.0 | 9.0 | 9.4 | 8.0 | 9.4 | 11.3 |
|  | cord gauge (mm) | 0.78 | 0.77 | 0.81 | 0.78 | 0.81 | 0.80 |
| end count (cords/cm) |  | 10.0 | 10.0 | 9.0 | 9.7 | 9.5 | 10.0 |
| reinforcing cord occupancy rate (%) |  | 78 | 77 | 73 | 75.7 | 77 | 80 |
| treat tenacity (kN/cm) |  | 3.00 | 3.05 | 3.02 | 2.91 | 3.18 | 2.95 |
| evaluation result | durability (index) | 116 | 121 | 121 | 116 | 124 | 106 |
|  | side cut performance (index) | 110 | 115 | 115 | 103 | 120 | 110 |
|  | water pressure (index) | 111 | 116 | 113 | 106 | 121 | 108 |
|  | inner pressure cord protrusion failure rate | ○ | ○ | ○ | ○ | ○ | ○ |

13 tread portion

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| reinforcing cord | structure | 1 ply | 1 ply | 1 ply | 1 ply | 1 ply | 1 ply | 1 ply |
|  | material | PET | PET | PET | PET | PET | PET | PET |
|  | cord size | 2200 dtex/2 | 1670 dtex/2 | 2200 dtex/2 | 3340 dtex/2 | 2000 dtex/2 | 2600 dtex/2 | 2200 dtex/2 |
|  | twist coefficient | 0.55 | 0.48 | 0.48 | 0.48 | 0.48 | 0.48 | 0.42 |
|  | dip cord strength (cN/dtex) | 6.3 | 6.74 | 6.82 | 6.59 | 6.74 | 6.74 | 7.4 |
|  | 2cN/dtex cord elongation at a stress loading (%) | 4.4 | 3.6 | 4.0 | 3.9 | 3.6 | 3.6 | 3.2 |
|  | heat shrinkage stress of dip cord (N) | 6.0 | 4.8 | 8.0 | 13.0 | 7.4 | 12.2 | 12.5 |
|  | cord gauge (mm) | 0.80 | 0.66 | 0.78 | 0.90 | 0.73 | 0.83 | 0.75 |
| end count (cords/cm) |  | 10.0 | 11.0 | 11.0 | 8.0 | 9.6 | 9.0 | 10.0 |
| reinforcing cord occupancy rate (%) |  | 80 | 73 | 85 | 72 | 70 | 74.7 | 75 |
| treat tenacity (kN/cm) |  | 2.77 | 2.48 | 3.30 | 3.52 | 2.59 | 3.15 | 3.26 |
| evaluation result | durability (index) | 100 | 96 | 66 | 116 | 98 | 121 | 126 |
|  | side cut performance (index) | 100 | 95 | 115 | 119 | 98 | 115 | 120 |
|  | water pressure (index) | 100 | 96 | 116 | 121 | 98 | 116 | 121 |
|  | inner pressure cord protrusion failure rate | — | ○ | ○ | X | ○ | X | X |

As illustrated in the above Tables, in each of the tires of the Examples in which a polyester fiber cord satisfying the conditions of the present invention was used as the reinforcing cord of a carcass, and to which a carcass treat having a predetermined treat tenacity was applied, it was obvious that the safety factor and durability were improved without generating a problem of an increase in the weight of the tire and an increase in the inner surface cord protrusion failure.

DESCRIPTION OF SYMBOLS

1 bead core
2 carcass
3a, 3b belt layer
4 cap layer
5 layered layer
11 bead portion
12 side wall portion

The invention claimed is:

1. A pneumatic tire comprising one or more carcasses extending toroidally between bead cores embedded in a pair of bead portions respectively, wherein
a polyester fiber cord whose total decitex as a twisted cord is 4300 to 5100 dtex, whose cord strength as a dip treated cord is 6.5 to 7.2 cN/dtex and whose cord elongation at a stress loading of 2 cN/dtex is 3.5 to 4.0% is used as a reinforcing cord of the carcass, and the tenacity of a treat which is the reinforcing cord covered with rubber per unit width is 3.0 to 3.2 kN/cm.

2. The pneumatic tire according to claim 1, wherein the occupancy rate of the reinforcing cord in the treat is 70 to 80%.

3. The pneumatic tire according to claim 1, wherein the twist coefficient α of the reinforcing cord defined by the following formula:

$$\alpha = \tan\theta = 0.001 \times N \times \sqrt{(0.125 \times D/\rho)}$$

(in the formula, N represents the number of twist (cycle/10 cm), D represents a value which is half of the total decitex of the cord and ρ represents a specific gravity of the cord) is 0.42 to 0.55.

4. The pneumatic tire according to claim 1, wherein the heat shrinkage stress of the reinforcing cord per one cord as a dip treated cord at a temperature of 177° C. is 9.0 to 12 N.

5. The pneumatic tire according to claim 1, wherein the polyester fiber is polyethylene terephthalate fiber.

6. The pneumatic tire according to claim 1, wherein one side of the treat is subjected to an electron beam irradiation treatment as a pre-vulcanization, under an accelerating voltage of not lower than 200 kV and lower than 600 kV, an irradiation dose of 10 to 100 kGy, and the irradiated area is positioned inside the tire.

7. The pneumatic tire according to claim 1, wherein the cord strength of the polyester fiber cord as a dip treated cord is 6.7 to 6.93 cN/dtex.

8. The pneumatic tire according to claim 1, wherein the cord elongation at the stress loading of 2 cN/dtex of the polyester fiber cord is 3.6 to 3.8%.

\* \* \* \* \*